(12) United States Patent
Katsumoto et al.

(10) Patent No.: US 11,656,600 B2
(45) Date of Patent: May 23, 2023

(54) SIMULATION APPARATUS

(71) Applicant: FANUC CORPORATION, Yamanashi (JP)

(72) Inventors: Masahiro Katsumoto, Yamanashi (JP); Jost Kurzrock, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 134 days.

(21) Appl. No.: 17/022,092

(22) Filed: Sep. 16, 2020

(65) Prior Publication Data

US 2021/0096534 A1  Apr. 1, 2021

(30) Foreign Application Priority Data

Sep. 30, 2019  (JP) .............................. JP2019-180090

(51) Int. Cl.
- *G05B 19/4069* (2006.01)
- *G05B 19/4093* (2006.01)
- *G05B 19/4062* (2006.01)

(52) U.S. Cl.
CPC ..... *G05B 19/4069* (2013.01); *G05B 19/4062* (2013.01); *G05B 19/40938* (2013.01)

(58) Field of Classification Search
None
See application file for complete search history.

(56) References Cited

U.S. PATENT DOCUMENTS

| | | | | |
|---|---|---|---|---|
| 9,507,340 B2* | 11/2016 | Chung | ............... | G05B 19/4069 |
| 2007/0168057 A1* | 7/2007 | Blevins | ................ | G05B 13/022 |
| | | | | 700/53 |
| 2009/0259450 A1* | 10/2009 | Cleary | .................... | G06T 13/60 |
| | | | | 703/6 |
| 2011/0078885 A1* | 4/2011 | DeRoche | ................ | B23P 17/00 |
| | | | | 29/407.05 |
| 2012/0215352 A1* | 8/2012 | Eberst | .................... | B25J 9/1664 |
| | | | | 700/253 |
| 2012/0296462 A1* | 11/2012 | Otsuki | ............... | G05B 19/4069 |
| | | | | 700/104 |
| 2015/0134103 A1* | 5/2015 | Tsuda | .................. | G05B 19/4103 |
| | | | | 700/192 |
| 2015/0355622 A1* | 12/2015 | Bretschneider | ........ | G05B 19/41 |
| | | | | 700/159 |
| 2016/0008976 A1* | 1/2016 | Nagatsuka | ............... | B25J 9/163 |
| | | | | 700/253 |
| 2020/0333764 A1* | 10/2020 | Takahei | ............. | G05B 19/4086 |

FOREIGN PATENT DOCUMENTS

| | | | |
|---|---|---|---|
| WO | 2016174716 A1 | 11/2016 | |
| WO | WO-2016174716 A1 * | 11/2016 | ........... G05B 19/409 |

* cited by examiner

*Primary Examiner* — Mohammad Ali
*Assistant Examiner* — David Earl Ogg
(74) *Attorney, Agent, or Firm* — Hauptman Ham, LLP

(57) ABSTRACT

A simulation apparatus stores series data of positions of points (point sequence data) regarding feedback data from a motor which drives an axis of a machine tool, selects, from this stored point sequence data, a point which has a great impact on finished quality of a machined surface as a point for use in a simulation process, and performs the simulation process based on data regarding the selected point.

9 Claims, 9 Drawing Sheets

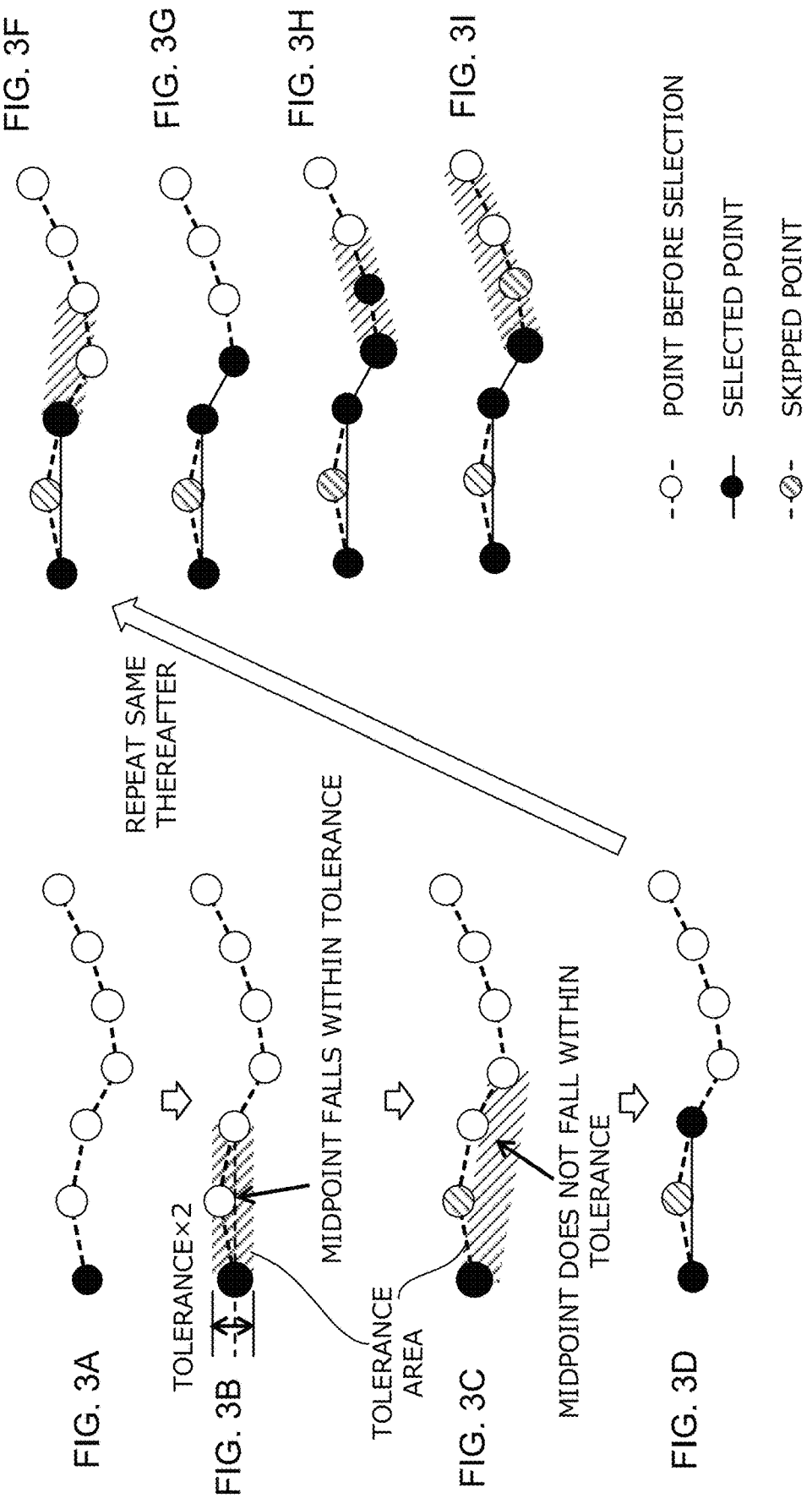

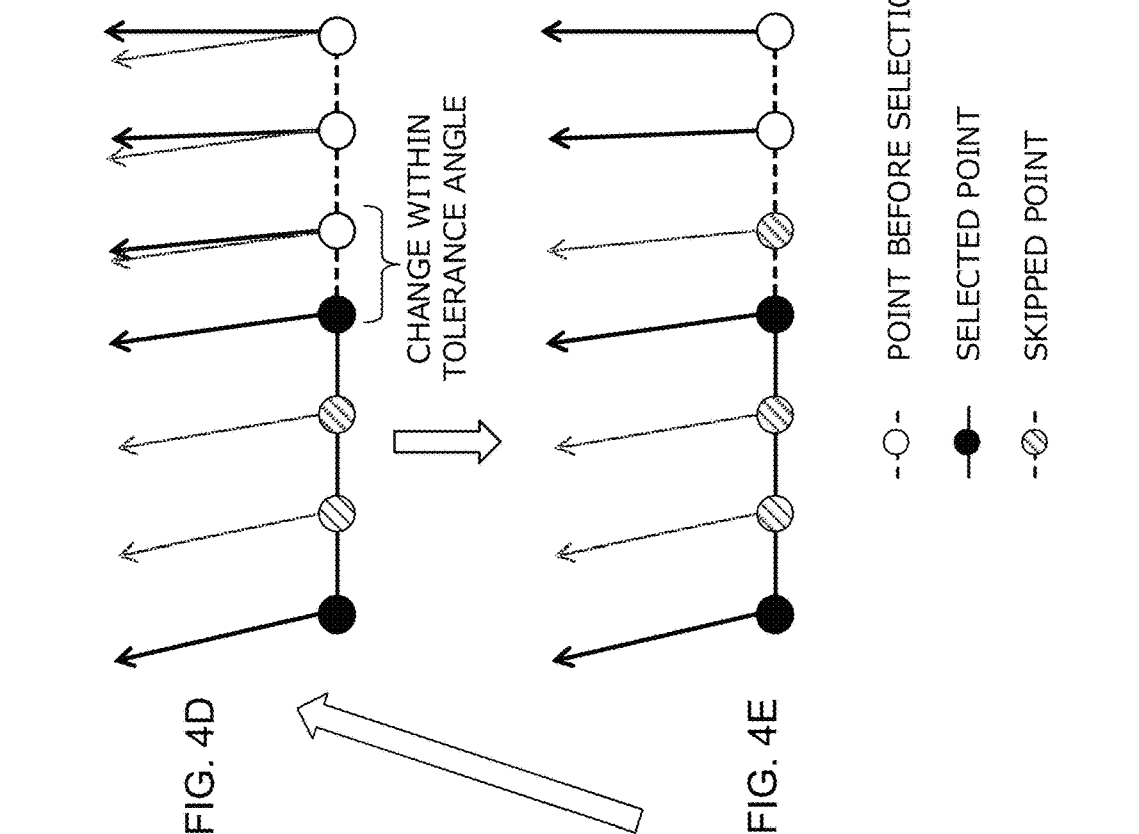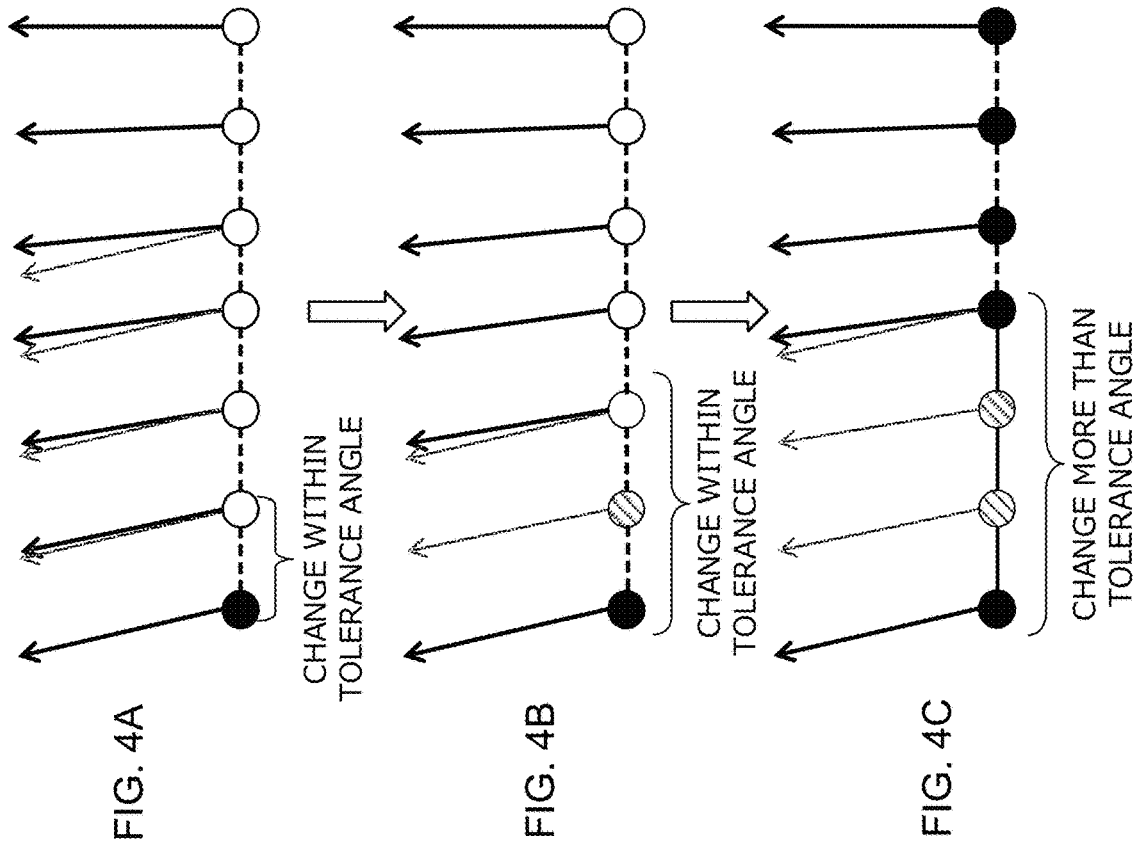

CHANGE AMOUNT WITHIN FIRST
TOLERANCE ERROR CHANGE AMOUNT

---- INSTRUCTED PATH
—○— ACTUAL PATH
—→ PATH ERROR
-○- POINT BEFORE SELECTION
—●— SELECTED POINT
—⊘— SKIPPED POINT

CHANGE AMOUNT MORE THAN FIRST
TOLERANCE ERROR CHANGE AMOUNT

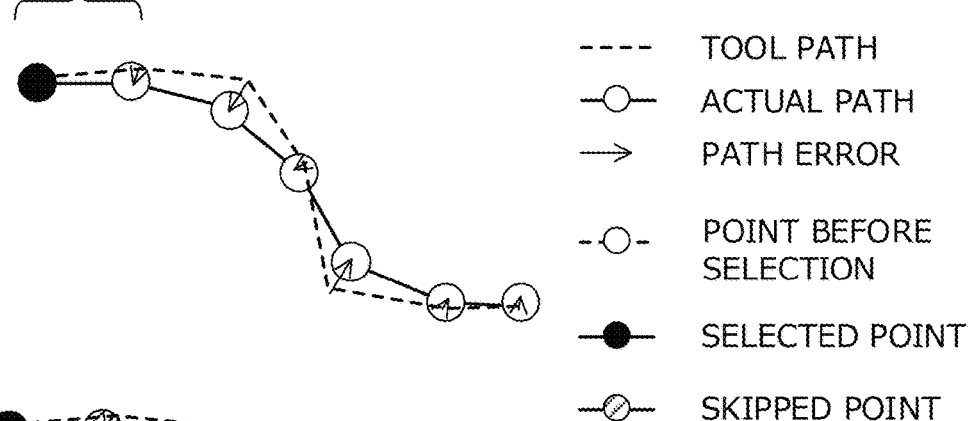
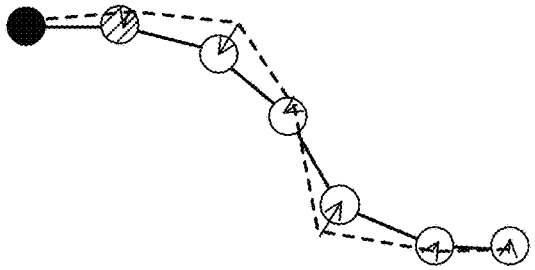
FIG. 6A
FIG. 6B
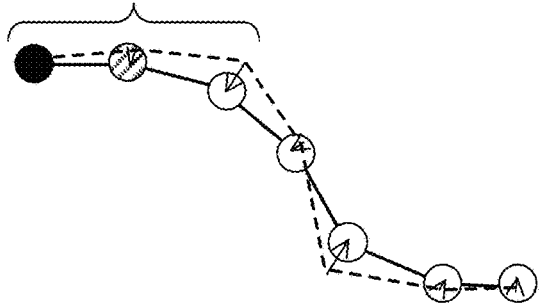
FIG. 6C
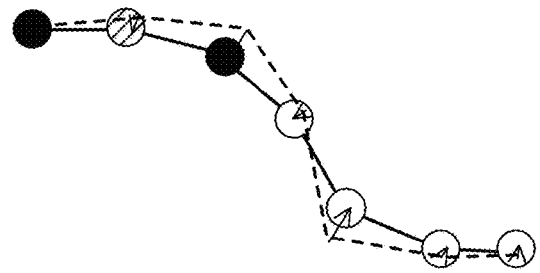
FIG. 6D

VIEW FRUSTUM: RANGE VIEWABLE FROM VISUAL POINT

AABB: Axis Aligned Bounding Box

SIMULATION APPARATUS

RELATED APPLICATIONS

The present application claims priority to Japanese Patent Application Number 2019-180090 filed Sep. 30, 2019, the disclosure of which is hereby incorporated by reference herein in its entirety.

BACKGROUND OF THE INVENTION

1. Field of the Invention

The present invention relates to simulation apparatuses and, in particular, a simulation apparatus which performs simulation based on feedback data from a servo motor.

2. Description of the Related Art

In a numerical controller, a tool path is calculated from a machining program to perform a machining simulation, thereby grasping the machining state and the machined shape and checking a collision between the tool and a jig, a table, a workpiece, or the like. However, even if a machining simulation is performed on a machining program and it has been confirmed that the machined shape and interference have no problem, when the workpiece is actually machined by executing that machining program, vibrations occur in the machine tool due to acceleration and its jerk of the driving axis and, thereby possibly having an impact on surface quality of the machined surface.

Meanwhile, conventional machining simulations are to calculate a tool path based on a machining program. To calculate a machining time more accurately, acceleration and deceleration of each axis are considered. However, vibrations due to acceleration and deceleration and their jerks are not simulated. Thus, for example, when high-quality machining susceptible to the impact of mechanical vibrations is required, surface quality cannot be checked unless the workpiece is actually machined.

As one means for checking the state of the machined surface after machining by a simulation, as illustrated in FIG. 11, there is a technique in which feedback data from each axis of a machine is stored and, by using that stored data, a display is generated which allows an error between the position in computer-assisted design data and that in the feedback data to be checked when a simulation is performed on the machined surface (for example, International Publication No. WO2016/174716 and so forth).

A general problem when a machining simulation is performed is that, as data for use in the simulation increases, the calculation time and the amount of memory usage of the RAM or the like in the simulation process increase, thereby increasing the time taken until the simulation results are displayed.

For example, to accurately display an impact on the machined surface by, for example, vibrations of the machine and backlash at the time of axis reversal based on the feedback data of the servo motor, a high sampling rate is required, and the number of pieces of data to be acquired is significantly increased. However, if the number of pieces of data is increased, the time required for a simulation process becomes longer, and the amount of memory usage is also increased. Thus, if data indicating all machined positions acquired as feedback data is directly used, it is difficult to perform simulation.

SUMMARY OF THE INVENTION

Thus, techniques have been desired for adjusting the amount of data for use in a simulation of machining in accordance with the tool movement situation and the display mode of the simulation results.

A simulation apparatus according to one aspect of the present invention includes a data selector unit between a servo data output unit and an input unit of a simulator for selecting data required for evaluation of a machined surface. The data selector unit solves the above-described problems by reducing the number of pieces of data for use in a simulation process in accordance with the movement situation of a tool. Also, the data selector unit reduces the number of pieces of data for use in the simulation process in accordance with the display mode of simulation results.

The simulation apparatus according to the present invention performs a simulation process based on feedback data from a motor which drives an axis of a machine tool, and includes: a point sequence data storage unit which stores point sequence data, which is series data of positions of points regarding the feedback data from the motor; a data selection unit which selects, from the point sequence data, a point which has a great impact on finished quality of a machined surface as a point for use in the simulation process; and a simulation performing unit which performs the simulation process based on data regarding the point selected by the data selection unit.

The data selection unit may select, as the point for use in the simulation process, a point located from a line segment passing through adjacent previous and subsequent points by a length more than a predetermined tolerance length defined in advance, among points included in the point sequence data.

The data selection unit may select, as the point for use in the simulation process, a point where a tool orientation is changed by an angle more than a predetermined tolerance angle defined in advance from a tool orientation at an immediately previous point already selected, among points included in the point sequence data.

The point sequence data storage unit may store, in association with the point sequence data, an instructed position for the motor when the feedback data is acquired, and the data selection unit may select, as the point for use in the simulation process, a point where an error from the instructed position is changed by an amount more than a predetermined first tolerance error change amount defined in advance from an error from the instructed position at an immediately previous point already selected, among points included in the point sequence data.

The point sequence data storage unit may store, in association with the point sequence data, a series of NC data executed when the feedback data is acquired, and the data selection unit may select, as the point for use in the simulation process, a point where an error from the NC data is changed by an amount more than a predetermined second tolerance error change amount defined in advance from an error from the NC data at an immediately previous point already selected, among points included in the point sequence data.

The data selection unit may include a first selector which selects a point which has a great impact on finished quality of the machined surface as a point for use in the simulation process and a second selector which selects a point included in a specified area as the point for use in the simulation process, and the data selection unit may select the point for use in the simulation process by using any of the first selector and the second selector based on a display mode of results of the simulation process performed by the simulation performing unit.

According to one aspect of the present invention, simulation time and amount of memory usage can be reduced while information required for graphic display of a machined surface is reserved.

BRIEF DESCRIPTION OF THE DRAWINGS

FIGS. 3A to 3D and FIG. 3F to 3I are diagrams describing a first selection method by a data selection unit.

FIGS. 4A to 4E are diagrams describing a second selection method by the data selection unit.

FIGS. 6A to 6D are diagrams describing a fourth selection method by the data selection unit.

DETAILED DESCRIPTION OF THE PREFERRED EMBODIMENTS

Figure 1:
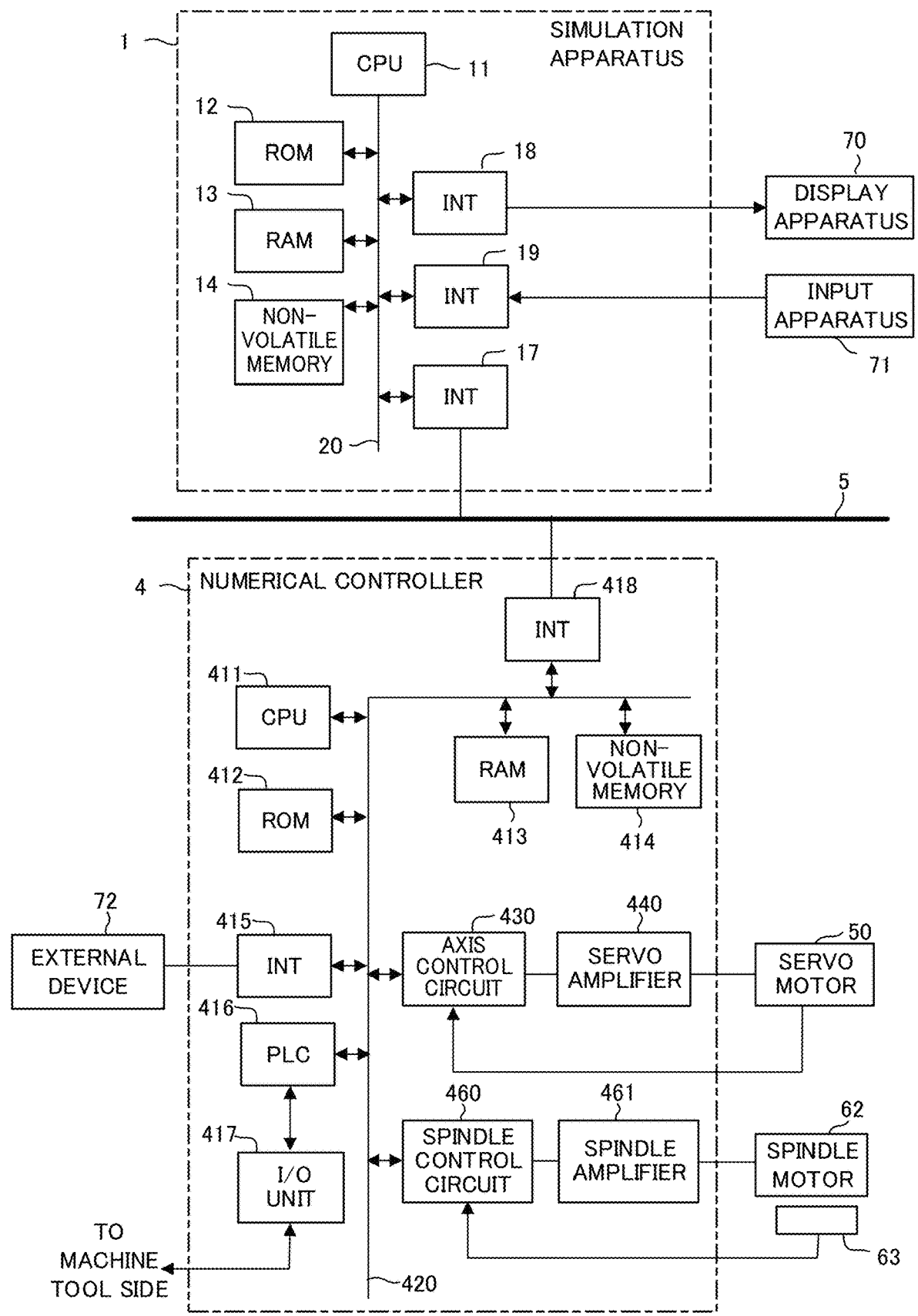
FIG. 1 is a schematic diagram of a hardware structure of a simulation apparatus according to one embodiment.

FIG. 1 is a schematic diagram of a hardware structure depicting main parts of a simulation apparatus according to one embodiment of the present invention.

A simulation apparatus 1 of the present invention can be implemented as, for example, a numerical controller which controls a machine tool based on a machining program. Also, the simulation apparatus 1 of the present invention can be implemented also as a personal computer, fog computer, cloud server, or the like connected to a personal computer annexed to a controller or connected to a controller via a network or the like. In the following embodiments, the simulation apparatus 1 of the present invention is taken as a personal computer connected via a network 5 or the like to a numerical controller 4 which controls a machine tool.

A CPU 11 included in the simulation apparatus 1 according to the present embodiment is a processor which controls the simulation apparatus 1 as a whole. The CPU 11 reads a system program stored in a ROM 12 via a bus 20, and controls the entire simulation apparatus 1 by following the system program. In a RAM 13, temporary calculation data, display data, each piece of data externally inputted, and so forth are temporarily stored.

A non-volatile memory 14 is configured of, for example, a memory, a solid state drive (SSD), or the like backed up by a battery not depicted, and the storage state is retained even if the simulation apparatus 1 is powered off. In the non-volatile memory 14, a program and data inputted via an input apparatus 71, data regarding the position and velocity of each motor inputted from the numerical controller 4 via the network 5 or the like, and so forth are stored. The program and each piece of data stored in the non-volatile memory 14 may be developed onto the RAM 13 when in execution/use. Also, in the ROM 12, various system programs such as a known analysis program are written in advance.

The simulation apparatus 1 is connected to the network 5 via an interface 17. For example, the numerical controller 4 which controls a machine tool and computers such as a fog computer and a cloud server are connected to the network 5 for mutual data communication (transmission and reception) with the simulation apparatus 1.

On a display apparatus 70, data acquired as a result of execution of each piece of data, program, and so forth read onto the memory, images of results of a simulation process, and so forth are outputted via an interface 18 and displayed. Also, the input apparatus 71 configured of a keyboard, pointing device, and so forth passes, via an interface 19, instructions, data, and the like based on the operation by an operator, to the CPU 11.

Meanwhile, a CPU 411 included in the numerical controller 4 connected to the simulation apparatus 1 via the network 5 is a processor which controls the numerical controller 4 as a whole. The CPU 411 reads a system program stored in a ROM 412 via a bus 420, and controls the entire numerical controller 4 by following the system program. In a RAM 413, temporary calculation data, display data, various kinds of data externally inputted, and so forth are temporarily stored.

A non-volatile memory 414 is configured of, for example, a memory, a solid state drive (SSD), or the like backed up by a battery (not depicted), and the storage state is retained even if the numerical controller 4 is powered off. In the non-volatile memory 414, a program read from an external device 72 via an interface 415, a program inputted via a display/MDI unit (not depicted), feedback data of the position and velocity of each motor fed back from a position/velocity detector included in a servo motor 50 and a position coder 63 attached to a spindle motor 62, and so forth are stored. The program and various kinds of data stored in the non-volatile memory 414 may be developed onto the RAM 413 when in execution/use. Also, in the ROM 412, various system programs such as a known analysis program are written in advance.

The interface 415 is an interface for connection between the CPU 411 of the numerical controller 4 and the external device 72 such as a USB device. Programs, various parameters, and so forth for use in controlling a machine tool are read from an external device 72 side. Also, programs, various parameters, and so forth edited in the numerical controller 4 can be stored in external storage means via the external device 72. A programmable logic controller (PLC) 416 uses a sequence program incorporated in the numerical controller 4 to output a signal to the machine tool and a peripheral apparatus of the machine tool (for example, a tool exchange apparatus, an actuator of a robot or the like, a sensor attached to the machine tool, or the like) via an I/O unit 417 for control. Also, the PLC 416 receives signals from various switches on a control panel disposed on the main body of the machine tool, the peripheral apparatus, and so forth, performs required signal processing, and then passes the signals to the CPU 411.

The numerical controller 4 is connected to the network 5 via an interface 418. The numerical controller 4 is configured to be able to perform data communication (transmission and reception) with the simulation apparatus 1 via the network 5.

An axis control circuit 430 for controlling an axis included in the machine tool receives an instruction regarding the amount of movement of the axis from the CPU 411, and outputs the instruction as to the axis to a servo amplifier 440. The servo amplifier 440 receives this instruction, and drives the servo motor 50 for moving the axis included in the machine tool. The servo motor 50 for the axis has a position/velocity detector incorporated therein, and feeds back a position/velocity feedback signal from this position/velocity detector to the axis control circuit 430 for position/velocity feedback control. While only one axis control circuit 430, one servo amplifier 440, and one servo motor 50 are depicted in the hardware structure diagram of FIG. 1, in practice, they are prepared as many as the number of axes included in the machine tool as a control target. For example, to control a five-axis machine tool including three straight axes and two rotational axes, five sets of the axis control circuit 430, the servo amplifier 440, and the servo motor 50 are prepared as follows: (1) axis control circuits 430, servo amplifiers 440, and servo motors 50 for causing a tool and a workpiece to relatively make a linear movement to X, Y, and Z axis directions and (2) axis control circuits 430, servo amplifiers 440, and servo motors 50 for causing the tool and the workpiece to relatively make a rotational movement to A and C axis (or B axis) directions.

A spindle control circuit 460 receives a spindle rotation instruction, and outputs a spindle velocity signal to a spindle amplifier 461. The spindle amplifier 461 receives this spindle velocity signal, and causes the spindle motor 62 of the machine tool to rotate at the instructed rotation velocity to rotationally drive the tool. The spindle motor 62 has the position coder 63 coupled thereto. The position coder 63 outputs a feedback pulse in synchronization with the rotation of the spindle, and its feedback pulse is read by the CPU 411.

Figure 2:
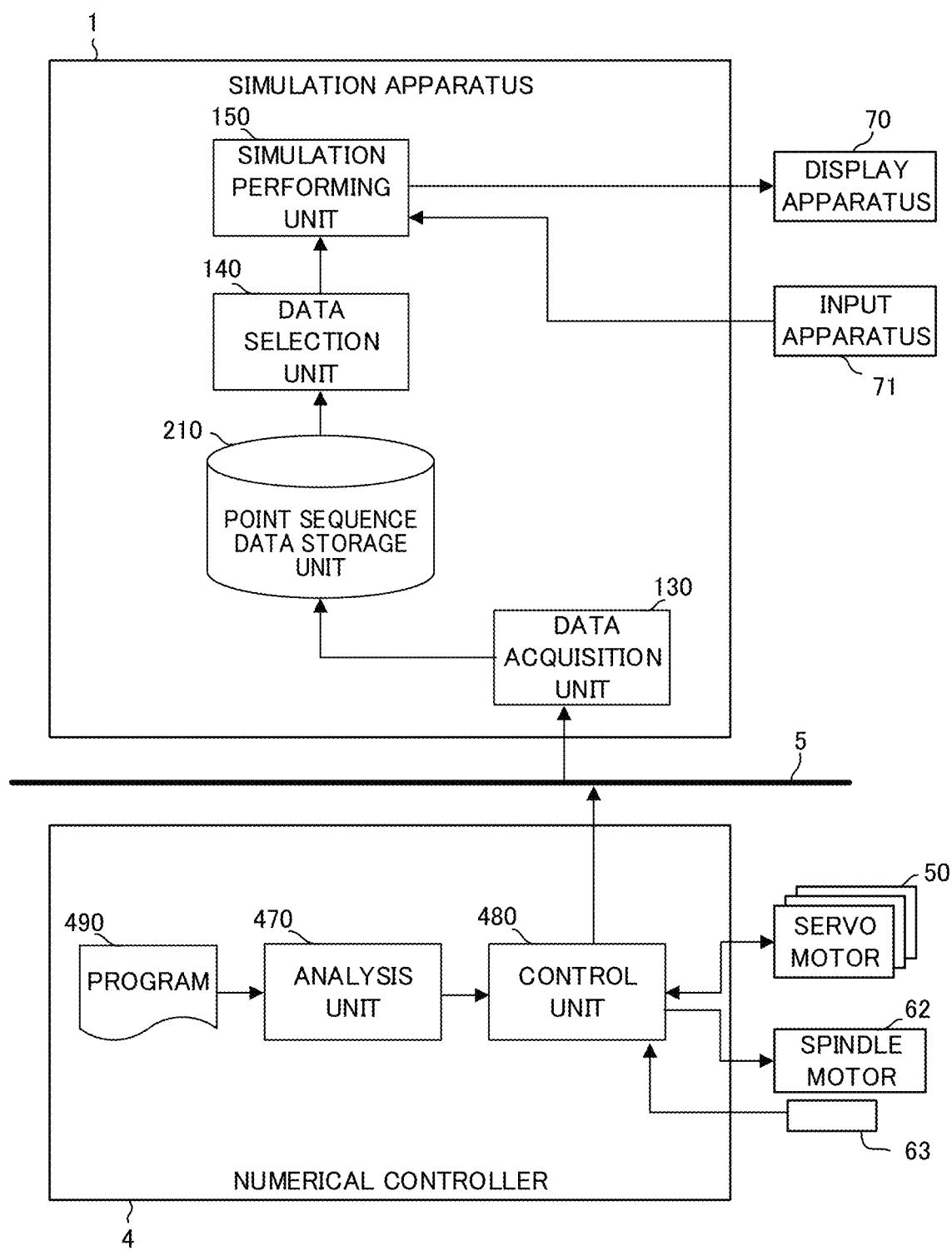
FIG. 2 is a schematic functional block diagram of a simulation apparatus according to a first embodiment.

FIG. 2 is a schematic block diagram depicting functions that the simulation apparatus 1 according to a first embodiment of the present invention has and functions that the numerical controller 4 capable of outputting data to the simulation apparatus 1 has.

Each block included in the simulation apparatus 1 depicted in FIG. 2 is implemented by the CPU 11 included in the simulation apparatus 1 depicted in FIG. 1 executing the system program and controlling the operation of each unit of the simulation apparatus 1. Also, each block included in the numerical controller 4 depicted in FIG. 2 is implemented by the CPU 411 included in the numerical controller 4 depicted in FIG. 1 executing the system program and controlling the operation of each unit of the numerical controller 4. The numerical controller 4 according to the present embodiment controls a machine tool which relatively moves the tool and the workpiece by a plurality of servo motors 50 to machine the workpiece by using the tool rotationally driven by the spindle motor 62.

The numerical controller 4 of the present embodiment includes an analysis unit 470 and a control unit 480. Also, in the non-volatile memory 414 of the numerical controller 4, a program 490 is stored in advance for controlling the operation of the machine tool to machine the workpiece.

The analysis unit 470 is implemented by the CPU 411 included in the numerical controller 4 depicted in FIG. 1 executing the system program read from the ROM 412 and causing mainly an arithmetic process to be performed by the CPU 411 using the RAM 413 and the non-volatile memory 414. The analysis unit 470 reads and analyzes a block of the program 490 to generate movement instruction data for each servo motor 50 and spindle instruction data for making a spindle rotation instruction. Based on a feed instruction made by the block of the program 490, the analysis unit 470 generates movement instruction data for each servo motor 50. Also, based on the spindle rotation instruction made by the block of the program 490, the analysis unit 470 generates spindle instruction data.

The control unit 480 is implemented by the CPU 411 included in the numerical controller 4 depicted in FIG. 1 executing the system program read from the ROM 412 and causing mainly an arithmetic process to be performed by the CPU 411 using the RAM 413 and the non-volatile memory 414, a control process on each servo motor 50 to be performed by the axis control circuit 430 and the servo amplifier 440, and a control process on the spindle motor 62 to be performed by the spindle control circuit 460 and the spindle amplifier 461.

The control unit 480 drives each servo motor 50 and the spindle motor 62 based on the movement instruction data and the spindle instruction data generated by the analysis unit 470. Also, the control unit 480 transmits, to the simulation apparatus 1 via the network 5, time series data indicating the position of each servo motor 50 fed back from the position/velocity detector of each servo motor 50. Here, in addition to the fed-back data, the control unit 480 may transmit, to the simulation apparatus 1, time series data regarding the position for each servo motor 50 instructed by the control unit 480. Also, in addition to the fed-back data, the control unit 480 may transmit, to the simulation apparatus 1, data including timing of executing each block included in the program 490 (data including timing of executing NC data).

Meanwhile, the simulation apparatus 1 of the present embodiment includes a data acquisition unit 130, a data selection unit 140, and a simulation performing unit 150. Also, the non-volatile memory 14 of the simulation apparatus 1 is provided with a point sequence data storage unit 210 as an area for storing point sequence data indicating a series of positions and orientations of a tool tip.

The data acquisition unit 130 is implemented by the CPU 11 included in the simulation apparatus 1 depicted in FIG. 1 executing the system program read from the ROM 12 and causing mainly an arithmetic process to be performed by the CPU 11 using the RAM 13 and the non-volatile memory 14. The data acquisition unit 130 generates point sequence data based on the time series data indicating the position of each servo motor 50 received from the numerical controller 4, and causes the generated point sequence data to be stored in the point sequence data storage unit 210.

The point sequence data represents transitions of positions and orientations of the tool tip arranged on a time series basis. Data indicating the position and orientation of the tool tip at each point in time configuring the point sequence data is generated based on the position of each motor fed back from each servo motor 50 at the same time of day. When time series data indicating the position of each servo motor 50 is inputted from the numerical controller 4, the data acquisition unit 130 according to the present embodiment takes the position of each servo motor 50 acquired at each time of day as a set and uses data regarding the tool shape (such as the tool length) acquired or set in advance from the numerical controller 4, thereby generating data regarding the position and orientation of the tool tip at each time of day. Then, the data acquisition unit 130 causes the data regarding the position and orientation of the tool tip associated with each time of day to be stored as point sequence data in the point sequence data storage unit 210. In the point sequence data storage unit 210, time series data regarding the position for each servo motor 50 instructed by the control unit 480 at each time of day may be stored so as to be associated with the point sequence data. Also, in the point sequence data storage unit 210, data including timing of executing NC data may be stored so as to be associated with the point sequence data.

The data selection unit 140 is implemented by the CPU 11 included in the simulation apparatus 1 depicted in FIG. 1 executing the system program read from the ROM 12 and causing mainly an arithmetic process to be performed by the CPU 11 using the RAM 13 and the non-volatile memory 14. In accordance with a mode of displaying the results of a simulation process to be performed by the simulation performing unit 150, the data selection unit 140 selects data of a point for use in the simulation process from the point sequence data stored in the point sequence data storage unit 210.

For example, when the simulation performing unit 150 performs a simulation on the entire machined area, the data selection unit 140 selects, from the point sequence data, data of a point considered to have a great impact on the machined surface as data for use in the simulation process.

As a first example of a method of selecting point data considered to have a great impact on the machined surface, a selection method based on the position of the tool tip indicated by point data can be thought. In the selection method based on the position indicated by point data, among points included in the point sequence data, a point far away from a line segment passing through adjacent previous and subsequent points is selected as data of a point for use in a simulation process. That is, changes in position of the tool tip are checked in chronological order and, when a midpoint among adjacent three points does not fall within a tolerance area (allowable area) with reference to two endpoints of the three points, that point is selected as data of the point for use in the simulation process.

FIGS. 3A to 3D and FIG. 3F to 3I are diagrams describing the selection method based on the position indicated by point data.

It is assumed that point sequence data illustrated in FIG. 3A is stored in the point sequence data storage unit 210. First, a point associated with the earliest time of day in the point sequence data is selected as data of a point for use in the simulation process. Next, while the point sequence data is checked in chronological order with reference to the selected point, three adjacent points including the selected point are extracted. Then, two endpoints among the extracted three points are connected together with a straight line, and an area with a double width of a predetermined tolerance length set in advance to a direction perpendicular to the straight line is defined as a tolerance area (FIG. 3B). When the midpoint among the adjacent three points falls within this tolerance area, that point is skipped as a point not for use in the simulation process. When the point is skipped, as for the point sequence data from which the skipped point was excluded, while the point sequence data is checked from the selected point in chronological order, adjacent three points are extracted again. Then, as with the above, a tolerance area is defined and, when the midpoint among the adjacent three points does not fall within the tolerance area (FIG. 3C), that midpoint is selected as data of a point for use in the simulation process (FIG. 3D). Then, with reference to the point newly selected as data of a point for use the simulation process, a similar process is repeated. Finally, a point associated with the latest time of day in the point sequence data is selected as data of a point for use in the simulation process.

By performing the above-described process, only data of a point with a large positional change compared with surrounding points is selected as data of a point for use in the simulation process. By performing a simulation using thus selected data of the point, while a portion where the tool position gently changes and a portion with a small change are not reflected on the image of the simulation results, a portion where there is a change more than a predetermined tolerance set in advance is reflected on the image of the simulation results. By adopting this selection method, a significant reduction in calculation time and the amount of memory usage of the RAM or the like in the simulation process can be expected particularly for machining of a workpiece with a flat surface or a gentle surface. Also, since detailed rendering of the flat surface or the gentle surface is not required to grasp the tendency of the entire machined area of the workpiece, the image of the simulation results to be generated can withstand the demands from the operator.

As a second example of the method of selecting point data considered to have a great impact on the machined surface, a selection method based on the orientation of the tool indicated by point data can be thought. In the selection method based on the orientation of the tool indicated by point data, changes in orientation of the tool are checked in chronological order and, when its change angle does not fall within a tolerance angle (allowable angle) with reference to the tool orientation at the immediately previous point, that point is selected as data of the point for use in the simulation process.

FIGS. 4A to 4E are diagrams describing the selection method based on the orientation of the tool indicated by point data.

It is assumed that point sequence data illustrated in FIG. 4A is stored in the point sequence data storage unit 210. First, a point associated with the earliest time of day in the point sequence data is selected as data of a point for use in the simulation process. Next, with reference to the selected point, a point adjacent to that selected point is extracted from the point sequence data. Then, when a change in the orientation of the tool at the extracted point with respect to the orientation of the tool at the selected point is within a predetermined tolerance angle defined in advance, that extracted point is skipped as a point not for use in the simulation process (FIG. 4B). When the point is skipped, as for the point sequence data from which the skipped point was excluded, while the selected point is still used as a reference, a point adjacent to that selected point is extracted. Then, when a change in the orientation of the tool at the extracted point with respect to the orientation of the tool at the selected point is more than the predetermined tolerance angle defined in advance (FIG. 4C), that extracted point is selected as data of a point for use in the simulation process (FIG. 4D). Then, with reference to the point newly selected as data of a point for use in the simulation process, a similar process is repeated. Finally, a point associated with the latest time of day in the point sequence data is selected as data of a point for use in the simulation process.

By performing the above-described process, only data of a point with a large positional change of the tool in contact with the workpiece at the time of cutting when workpiece machining is performed is selected as data of a point for use in the simulation process. When machining is performed with a portion except the tool tip point such as a tool side surface, even if there is no change in the position of the tool tip point but a change in the position of the tool in contact with the workpiece, finished quality in machining may change. Thus, by adopting the above-described selection method, a portion where the position of the tool in contact with the workpiece is not changed can be omitted from targets for the simulation process. On the other hand, a portion where the position of the tool in contact with the workpiece is greatly changed appears in the image of the simulation results. Thus, when the tendency of the entire machined area is grasped, a portion where the shape of the tool, such as a taper ball end mill or a bull nose end mill, has an impact can be grasped.

As a third example of the method of selecting point data considered to have a great impact on the machined surface, a selection method based on an error between a path (hereinafter referred to as an instructed path) of the position of an instructed point for the servo motor 50 (that is, a position for the servo motor 50 instructed by the control unit 480) and a path (hereinafter referred to as an actual path) of the actual position of the tool tip based on the position fed back from the servo motor 50 can be thought. In the selection method based on an error (path error between the instructed path and the actual path, when the change amount of the path error does not fall within a tolerance error change amount (allowable error change amount), that point is selected as data of a point for use in the simulation process.

FIGS. 5A to 5D are diagrams describing the selection method based on the path error between the instructed path and the actual path.

Figure 5A:
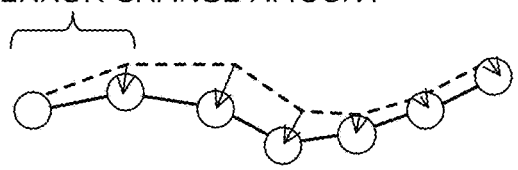
FIGS. 5A to 5D are diagrams describing a third selection method by the data selection unit.
Figure 5B:
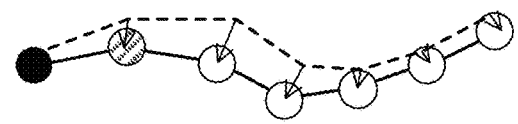
Figure 5C:
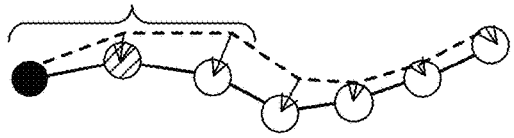
Figure 5D:
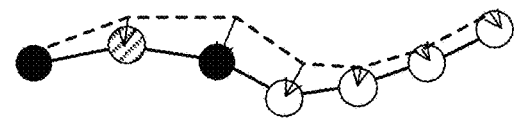

As illustrated in FIG. 5A, it is assumed that the point sequence data and the instructed path are stored in association with each other in the point sequence data storage unit 210. First, a point associated with the earliest time of day in the point sequence data is selected as 'data of a point for use in the simulation process'. Next, with reference to the selected point, a point adjacent to that selected point is extracted from the point sequence data. Then, when a difference (change amount of the path error) between the error (path error) between the instructed path and the actual path at the selected point and the error (path error) between the instructed path and the actual path at the extracted point is within a first tolerance error change amount defined in advance, that extracted point is skipped as a point not for use in the simulation process (FIG. 5B). When the point is skipped, as for the point sequence data from which the skipped point was excluded, while the selected point is still used as a reference, a point adjacent to that selected point is extracted. Then, when the difference (change amount of the path error) between the error (path error) between the instructed path and the actual path at the selected point and the error (path error) between the instructed path and the actual path at the extracted point is more than the first tolerance error change amount (FIG. 5C), that extracted point is selected as data of a point for use in the simulation process (FIG. 5D). Then, with reference to the point newly selected as data of a point for use in the simulation process, a similar process is repeated. Finally, a point associated with the latest time of day in the point sequence data is selected as data of a point for use in the simulation process.

By performing the above-described process, only data of a point with a large change of the error between the position for the servo motor 50 instructed by the control unit 480 and the position fed back from the servo motor 50 when workpiece machining is performed is selected as data of a point for use in the simulation process. While finished quality in machining does not change much when the path error is steadily deviated, if the path error is changed more than a predetermined amount, finished quality in machining may change in accordance with the change amount. Thus, by adopting the above-described selection method, a portion where the path error is greatly changed when, for example, a movement delays due to a load on the motor or the position of the motor is fluctuated due to disturbance appears in the image of the simulation results, and it is thus possible to grasp a portion where fluctuations of the path error have an impact on finished quality in machining, when the tendency of the entire machined area is grasped.

As a fourth example of the method of selecting point data considered to have a great impact on the machined surface, a selection method based on an error between a path of the tool included in CAD/CAM data (which is of a NC data series and hereinafter referred to as a tool path) and a path of the actual position of the tool tip based on the position fed back from the servo motor 50 can be thought. In the selection method based on the error (path error) between the tool path and the actual path, when the change amount of the path error does not fall within a tolerance error change amount (allowable error change amount), that point is selected as data of a point for use in the simulation process.

FIGS. 6A to 6D are diagrams describing the selection method based on the path error between the tool path and the actual path.

As illustrated in FIG. 6A, it is assumed that the point sequence data and the tool path are stored in association with each other in the point sequence data storage unit 210. First, a point associated with the earliest time of day in the point sequence data is selected as data of a point for use in the simulation process. Next, with reference to the selected point, a point adjacent to that selected point is extracted from the point sequence data. Then, when a difference (change amount of the path error) between the error (path error) between the tool path and the actual path at the selected point and the error (path error) between the tool path and the actual path at the extracted point is within a predetermined second tolerance error change amount, that extracted point is skipped as a point not for use in the simulation process (FIG. 6B). When the point is skipped, as for the point sequence data from which the skipped point was excluded, while the selected point is still used as a reference, a point adjacent to that selected point is extracted. Then, when the difference (change amount of the path error) between the error (path error) between the tool path and the actual path at the selected point and the error (path error) between the tool path and the actual path at the extracted point is more than the second tolerance error change amount (FIG. 6C), that extracted point is selected as data of a point for use in the simulation process (FIG. 6D). Then, with reference to the point newly selected as data of a point for use in the simulation process, a similar process is repeated. Finally, a point associated with the latest time of day in the point sequence data is selected as data of a point for use in the simulation process.

By performing the above-described process, only data of a point with a large change of the error between the tool path generated by a CAD/CAM apparatus and the position fed back from the servo motor 50 when workpiece machining is performed is selected as data of a point for use in the simulation process. The numerical controller 4 generates a position instruction to the servo motor 50 based on the tool path generated by the CAD/CAM apparatus. Here, depending on the control algorithm of the numerical controller 4, the servo motor 50 may be instructed so as to have a path different from the tool path (such as an inner path error). By adopting this selection method, a portion where the tool has moved along a path different from the tool path indicated by the CAD/CAM data appears in the image of the simulation results, and it is thus possible to grasp a portion where fluctuations of the path error have an impact on finished quality in machining, when the tendency of the entire machined area is grasped.

The data selection unit 140 may be configured to use any single one of the methods of selecting point data for use in the simulation. Also, the data selection unit 140 may concurrently use a plurality of the methods of selecting point data for use in the simulation. When a plurality of the methods of selecting point data are concurrently used, all pieces of point data selected in the respective selection methods can be used for the simulation.

The simulation performing unit 150 simulates the machining operation by the machine tool based on the point data selected by the data selection unit 140 and, as a result, generates and outputs data as general results of the simulation process, such as a relative movement route between the tool and the workpiece at the time of machining and the shape of the workpiece after machining. In a simulation process according to a prior art technique, a relative movement route between the tool and the workpiece is generated based on the instruction acquired from the program 490, and the shape of the workpiece after machining is generated as a simulation result based on the generated movement route (and the shape of the tool and so forth). The simulation performing unit 150 according to the present embodiment uses point data selected by the data selection unit 140. The simulation performing unit 150 may further use values of specifications of the machine tool set in advance, data regarding the workpiece, and so forth. As for other processes or functions of the simulation process to be performed by the simulation performing unit 150, any known simulation scheme may be adopted as appropriate. The results of the simulation performed by the simulation performing unit 150 are displayed as an image on the display apparatus 70.

The above-described simulation apparatus 1 according to the present embodiment performs a simulation process by using feedback data from each servo motor 50 acquired when the numerical controller 4 performs the program 490. Here, the simulation apparatus 1 selects point data considered to have a great impact on the machined surface from the feedback data acquired from each servo motor 50, and performs a simulation process using the selected point data. Thus, while the calculation time and the amount of memory usage of the RAM or the like in the simulation process are reduced, it is possible to acquire an image as the simulation results from which the state of the machined surface can be grasped to some extent.

Figure 7:
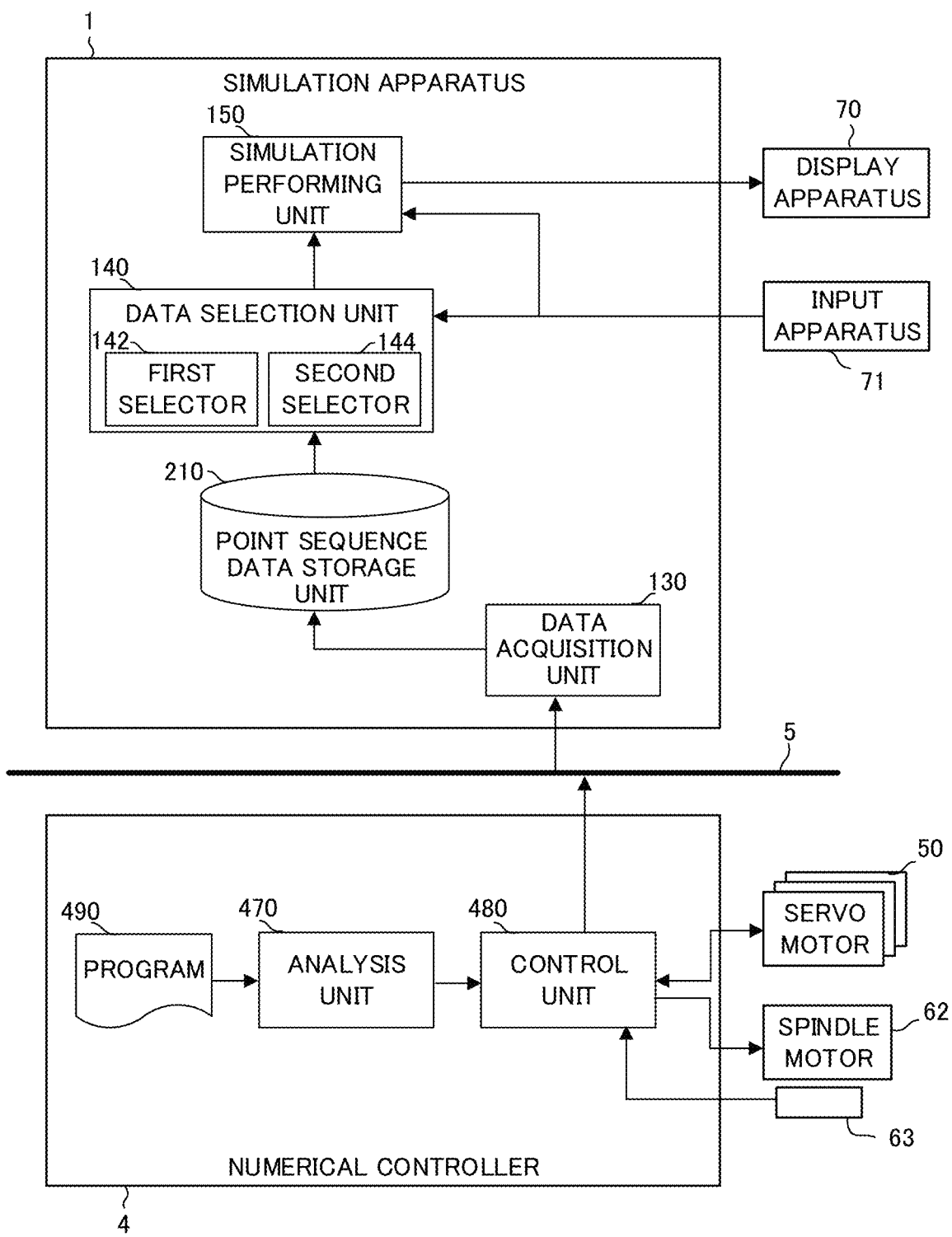
FIG. 7 is a schematic functional block diagram of a simulation apparatus according to a second embodiment.

FIG. 7 is a schematic block diagram depicting functions that the simulation apparatus 1 according to a second embodiment of the present invention has and functions that the numerical controller 4 capable of outputting data to the simulation apparatus 1 has.

Each block included in the simulation apparatus 1 depicted in FIG. 7 is implemented by the CPU 11 included in the simulation apparatus 1 depicted in FIG. 1 executing the system program and controlling the operation of each unit of the simulation apparatus 1. Also, each block included in the numerical controller 4 depicted in FIG. 7 is implemented by the CPU 411 included in the numerical controller 4 depicted in FIG. 1 executing the system program and controlling the operation of each unit of the numerical controller 4. The numerical controller 4 according to the present embodiment controls a machine tool which relatively moves the tool and the workpiece by a plurality of servo motors 50 to machine the workpiece by using the tool rotationally driven by the spindle motor 62.

The simulation apparatus 1 according to the present embodiment is different from the simulation apparatus 1 according to the first embodiment in that the data selection unit 140 includes a plurality of selector functions of switching in accordance with a display mode of simulation results.

The data selection unit 140 according to the present embodiment includes a first selector 142 which selects point sequence data when the simulation performing unit 150 performs a simulation on the entire machined area and a second selector 144 which selects point sequence data when the simulation performing unit 150 performs a detailed simulation on a part of the machined area.

The first selector 142 performs a process of selecting point sequence data by using at least any of the methods of selecting point data considered to have a great impact on the machined surface described in the first embodiment described above. The first selector 142 is suitable for generating an image of the simulation results from which the state of the machined surface can be grasped to some extent while the state of the entire machined area is roughly displayed.

Figure 8:
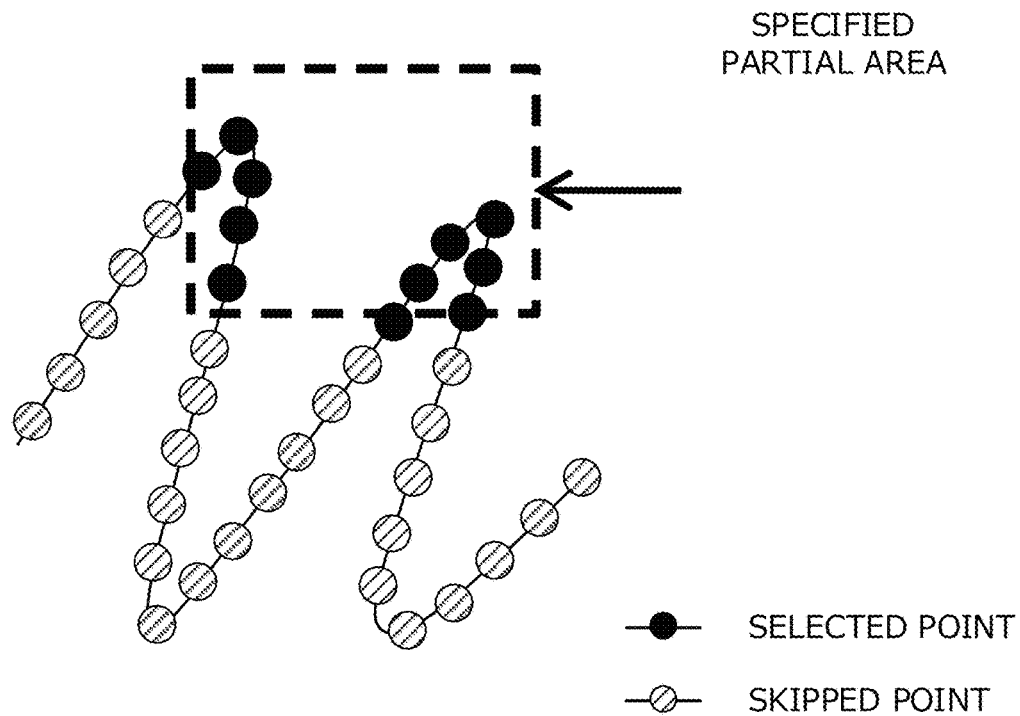
FIG. 8 is a diagram describing a method of selecting a point in a specified area by the data selection unit.

On the other hand, as illustrated in FIG. 8, when a partial area is specified in the machined area, the second selector 144 selects point sequence data in a range included in the specified partial area. More specifically, as data of a point for use in a simulation, the second selector 144 selects data of a point which interferes with the partial area in the machined area specified by the operator in the point sequence data stored in the point sequence data storage unit 210. The second selector 144 does not skip point sequence data included in the partial area displayed as a simulation result, and is thus suitable for generating an image of results of simulating the specified partial area in detail.

Figure 9:
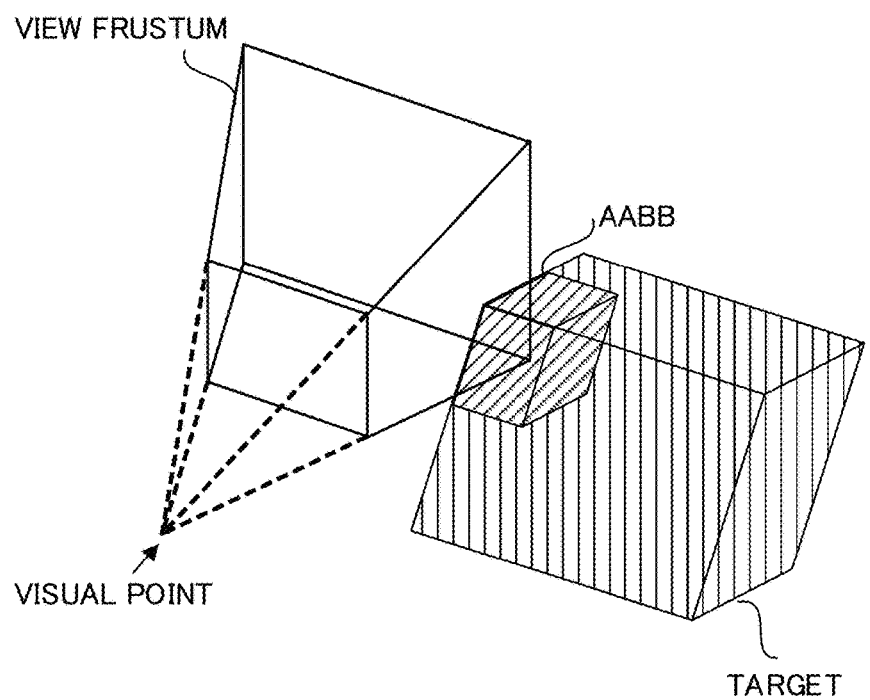
FIG. 9 is a diagram describing display of a target based on a visual point.

As a method of determining by the second selector 144 whether the partial area in the machined area specified by the operator interferes with each point included in the point sequence data, a scheme acquired by applying interference detection can be used. Generally, to display an image of the simulation results, when a part of a display target is displayed on a screen, as illustrated in FIG. 9, a predetermined visual point is placed on a virtual space, and a range viewable from the visual point is set as a view frustum. An axis aligned bounding box (AABB) including a range where the view frustum and a display target (machined area) cross is calculated. Interference detection is performed between thus calculated AABB and a 3D model of a tool arranged at points included in the point sequence data, and a point where the colliding 3D model of the tool is arranged is selected as a point for use in a simulation. As a interference detection algorithm, a general algorithm such as the known GJK algorithm can be used as required.

Whether to simulate the entire machined area or a part of the machined area in detail is determined by an operator who inputs an instruction for switching the display mode from the input apparatus 71 while viewing the display apparatus 70.

Figure 10:
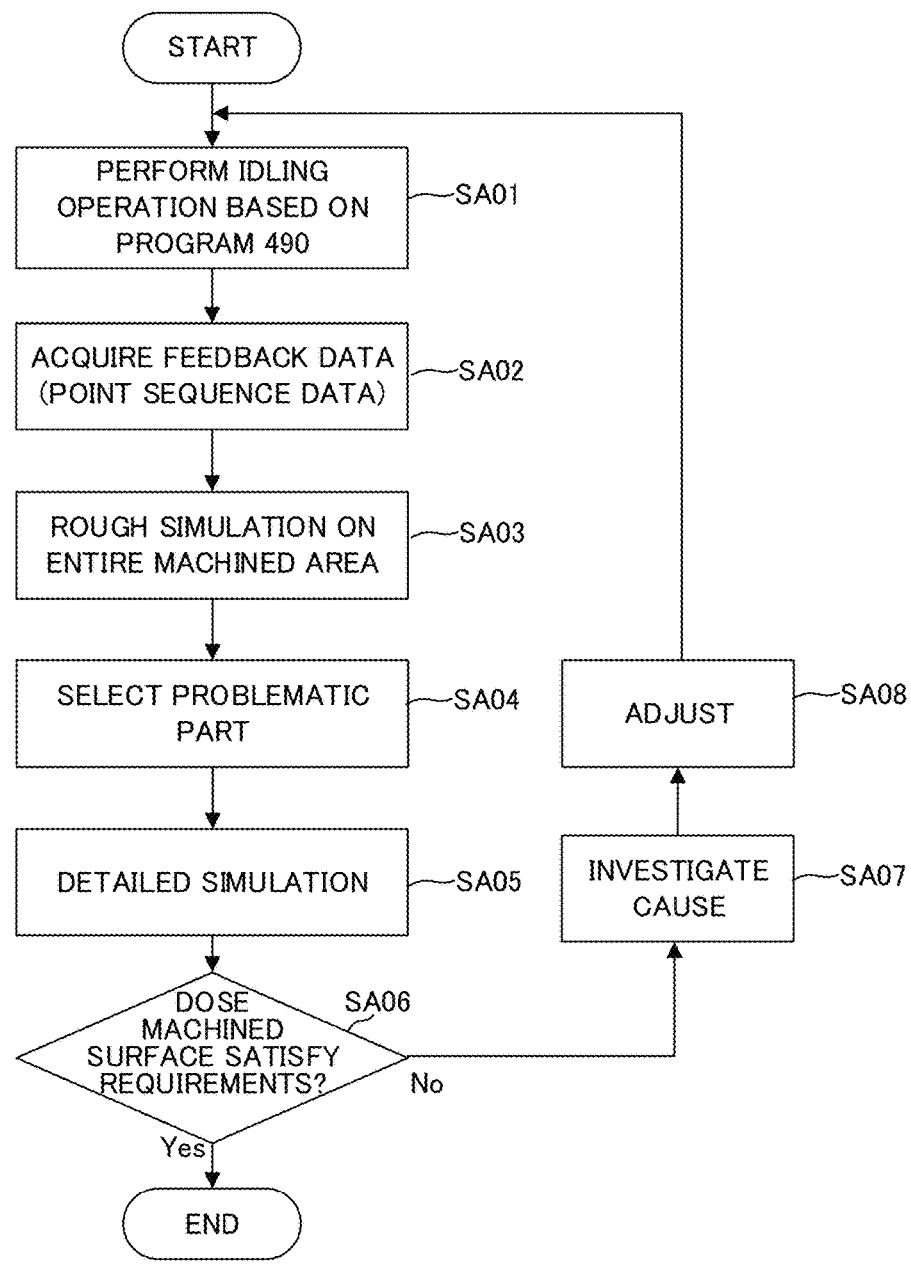
FIG. 10 is a flowchart depicting an operation procedure of improving machining conditions by using the simulation apparatus according to the second embodiment.
Figure 11:
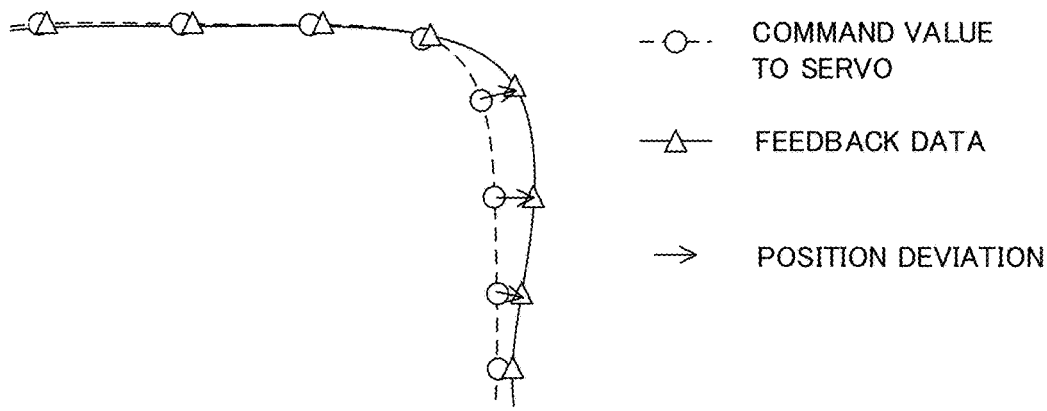
FIG. 11 is a diagram describing display of results of a simulation process according to a prior art technique.

FIG. 10 is a flowchart depicting an operation flow by an operator who sets machining conditions by using the simulation apparatus 1 of the present embodiment.

The operator causes the generated program 490 to be read into the numerical controller 4 to perform idling operation (step SA01). The numerical controller 4 transmits feedback data detected from the servo motor 50 at the time of idling operation to the simulation apparatus 1. The simulation apparatus 1 acquires point sequence data from the received feedback data and causes the point sequence data to be stored in the point sequence data storage unit 210 (step SA02). Next, the operator makes an instruction from the input apparatus 71 for simulating the entire machined area as an initial simulation. Here, the data selection unit 140 performs selection of point sequence data by the first selector 142. Then, the simulation performing unit 150 performs a simulation process on the entire machined area based on the selected point sequence data, and the results are displayed on the display apparatus 70 (step SA03).

Then, the operator makes an instruction for selecting a part where an occurrence of a problem on the machined surface is suspected from the image of the results of the simulation process on the entire machined area and simulating that part (step SA04). Then, the data selection unit 140 performs selection of point sequence data by the second selector 144. Then, the simulation performing unit 150 performs a simulation process on the specified part of the machined area based on the selected point sequence data, and the results are displayed on the display apparatus 70 (step SA05).

Viewing the image of the results of the detailed simulation process using the point sequence data selected by the second selector 144, the operator determines whether or not the requirements of machining have been satisfied (step SA06). If there is a problem, the operator investigates the problem in the machining conditions (step SA07), and adjusts the machining conditions (step SA08). By repeating this operation, when the operator determines that the requirements of machining have been satisfied, the operation of adjusting the machining conditions ends.

In the above-described simulation apparatus 1 according to the present embodiment, the data selection unit 140 selects point sequence data by switching between the first selector 142 and the second selector 144 in accordance with the display mode of the results of the simulation process. Thus, when a simulation process is performed on the entire machined area for display, points except those in a portion where there is a possibility of having an impact on the machined surface are skipped. When attention is paid to a partial area, a detailed simulation process is performed on points in that portion. In this manner, while the degree of minuteness of the simulation process is adjusted in accordance with the purpose, points as targets for the simulation process can be reduced as appropriate. Thus, while the calculation time and the amount of memory usage of the RAM or the like in the simulation process are reduced, it is possible to acquire an image as the simulation results in accordance with the display mode.

While the embodiments of the present invention have been described above, the present invention is not limited only to the examples of the embodiments described above and can be carried out in various aspects by making an appropriate modification.

While the data acquisition unit 130 generates a format of point sequence data based on the data fed back from each servo motor 50 in the above-described embodiments, it may be configured that the feedback data is converted in advance to a format of point sequence data in the numerical controller 4, another personal computer, or the like and this is acquired by the data acquisition unit 130.

Also, while the data acquisition unit 130 acquires the data fed back from each servo motor 50 from the numerical controller 4 via the network 5 in the above-described embodiments, for example, the feedback data acquired by the numerical controller 4 via an external device such as a USB memory or CF memory may be sent to the simulation apparatus 1.

While the simulation performing unit 150 performs a simulation process based on the point sequence data selected by the data selection unit 140 in the above-described embodiments, in addition to this, a simulation process may be performed based on time series data regarding positions for each servo motor 50 instructed by the control unit 480 and images of its results may be displayed as being superposed on images of the results of the simulation process based on the point sequence data. Here, a portion where there is a difference between the images of the simulation results based on the time series data regarding the instructed positions and the images of the results of the simulation process based on the point sequence data may be displayed with a different color so that the magnitude and direction of that difference can be grasped. Similarly, display may be made as being superposed on a screen of a workpiece based on CAD/CAM data.

The invention claimed is:

1. A simulation apparatus which performs a simulation process based on feedback data from a motor which drives an axis of a machine tool, the simulation apparatus comprising:
    a point sequence data storage unit which stores point sequence data, which is series data of positions of points regarding the feedback data from the motor;
    a data selection unit which, from the point sequence data, selects a point which does not fall within a tolerance range relating to finished quality of a surface machined by the machine tool, as a point for use in the simulation process, and
    skips a point which falls within the tolerance range, as a point not for use in the simulation process; and
    a simulation performing unit which performs the simulation process based on data regarding the point selected by the data selection unit.

2. A simulation apparatus which performs a simulation process based on feedback data from a motor which drives an axis of a machine tool, the simulation apparatus comprising:
    a point sequence data storage unit which stores point sequence data, which is series data of positions of points regarding the feedback data from the motor;
    a data selection unit which selects, from the point sequence data, a point which does not fall within a tolerance range relating to finished quality of a surface machined by the machine tool, as a point for use in the simulation process; and
    a simulation performing unit which performs the simulation process based on data regarding the point selected by the data selection unit, wherein
    the data selection unit selects, as the point for use in the simulation process, a point located from a line segment passing through adjacent previous and subsequent points by a length more than a predetermined tolerance length defined in advance, among points included in the point sequence data.

3. The simulation apparatus according to claim 1, wherein the data selection unit selects, as the point for use in the simulation process, a point where a tool orientation is changed by an angle more than a predetermined tolerance angle defined in advance from a tool orientation at an immediately previous point already selected, among points included in the point sequence data.

4. The simulation apparatus according to claim 1, wherein the point sequence data storage unit stores, in association with the point sequence data, an instructed position for the motor when the feedback data is acquired, and the data selection unit selects, as the point for use in the simulation process, a point where an error from the instructed position is changed by more than a predetermined tolerance error change amount defined in advance from an error from the instructed position at an immediately previous point already selected, among points included in the point sequence data.

5. The simulation apparatus according to claim 1, wherein
the point sequence data storage unit stores, in association with the point sequence data, a series of NC data executed when the feedback data is acquired, and the data selection unit selects, as the point for use in the simulation process, a point where an error from the NC data is changed by an amount more than a predetermined tolerance error change amount defined in advance from an error from the NC data at an immediately previous point already selected, among points included in the point sequence data.

6. The simulation apparatus according to claim 1, wherein
the data selection unit includes a first selector which selects a point which does not fall within a tolerance range relating to finished quality of the surface machined by the machine tool as a point for use in the simulation process and a second selector which selects a point included in a specified area as the point for use in the simulation process, and the data selection unit selects the point for use in the simulation process by using any of the first selector and the second selector based on a display mode of results of the simulation process performed by the simulation performing unit.

7. The simulation apparatus according to claim 1, wherein
the data selection unit includes
a first selector configured to select point sequence data in response to a simulation on an entirety of a machined area performed by the simulation performing unit, and
a second selector configured to select point sequence data in response to a detailed simulation on a part of the machined area performed by the simulation performing unit.

8. The simulation apparatus according to claim 7, wherein
the first selector is configured to perform a process of selecting point sequence data and generate an image of a simulation result from which a state of the surface machined by the machine tool and a state of the entirety of the machined area are displayed, and
when a partial area is specified by an operator in the machined area, the second selector is configured to select data of a point which interferes with the partial area in the point sequence data stored in the point sequence data storage unit.

9. The simulation apparatus according to claim 1, wherein
the simulation performing unit is further configured to perform a further simulation process based on time series data regarding positions for the motor, and
images of results of the further simulation process are displayed as being superposed on images of results of the simulation process based on the point sequence data.

* * * * *